(12) United States Patent
Igarashi et al.

(10) Patent No.: US 9,615,059 B2
(45) Date of Patent: Apr. 4, 2017

(54) IMAGING APPARATUS, MEDIUM, AND METHOD FOR IMAGING

(71) Applicants: Kiyoto Igarashi, Kanagawa (JP); Hiroaki Uchiyama, Kanagawa (JP); Koji Kuwata, Kanagawa (JP); Masato Takahashi, Tokyo (JP); Tomoyuki Goto, Kanagawa (JP); Kazuki Kitazawa, Kanagawa (JP); Nobumasa Gingawa, Kanagawa (JP)

(72) Inventors: Kiyoto Igarashi, Kanagawa (JP); Hiroaki Uchiyama, Kanagawa (JP); Koji Kuwata, Kanagawa (JP); Masato Takahashi, Tokyo (JP); Tomoyuki Goto, Kanagawa (JP); Kazuki Kitazawa, Kanagawa (JP); Nobumasa Gingawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/216,779

(22) Filed: Jul. 22, 2016

(65) Prior Publication Data
US 2017/0034481 A1 Feb. 2, 2017

(30) Foreign Application Priority Data
Jul. 28, 2015 (JP) .................................. 2015-149049

(51) Int. Cl.
*H04N 7/14* (2006.01)
*H04N 7/15* (2006.01)
(Continued)

(52) U.S. Cl.
CPC ........... *H04N 7/15* (2013.01); *H04L 65/1063* (2013.01); *H04L 65/403* (2013.01); *H04N 5/23296* (2013.01)

(58) Field of Classification Search
CPC .... H04N 7/15; H04N 5/23296; H04L 65/403; H04L 65/1063
See application file for complete search history.

(56) References Cited

U.S. PATENT DOCUMENTS

2010/0085415 A1* 4/2010 Rahman .................... G01S 3/80
348/14.08
2011/0090301 A1* 4/2011 Aaron ...................... H04N 7/15
348/14.08
(Continued)

FOREIGN PATENT DOCUMENTS

| JP | 2008-103824 | 5/2008 |
|---|---|---|
| JP | 2010-081644 | 4/2010 |
| WO | 2008/047804 | 4/2008 |

*Primary Examiner* — Stella Woo
(74) *Attorney, Agent, or Firm* — IPUSA, PLLC

(57) ABSTRACT

An imaging apparatus includes a storage unit to store information about one or more persons, the information about each of the persons including a direction in which the person exists, and permission for imaging the person by an imaging unit, and the information about each of the persons being associated with identification information to uniquely identify the person; a detection unit to detect a direction in which a person who speaks exists; a determination unit to determine whether the person in the detected direction is permitted for imaging, based on the information about the person stored in the storage unit; and a control unit to control an imaging direction of the imaging unit to turn towards the detected direction of the person, in a case where the determination unit has determined that the person in the detected direction is permitted for imaging.

9 Claims, 10 Drawing Sheets

(51) Int. Cl.
*H04N 5/232* (2006.01)
*H04L 29/06* (2006.01)

(56) References Cited

U.S. PATENT DOCUMENTS

| | | | |
|---|---|---|---|
| 2011/0285808 A1* | 11/2011 | Feng | H04N 7/142 |
| | | | 348/14.09 |
| 2012/0327176 A1* | 12/2012 | Kee | H04N 7/15 |
| | | | 348/14.08 |
| 2015/0046581 A1 | 2/2015 | Inoue | |
| 2015/0047002 A1 | 2/2015 | Tamura | |
| 2015/0071130 A1 | 3/2015 | Okuyama | |
| 2015/0111566 A1 | 4/2015 | Nakamura | |
| 2015/0133106 A1 | 5/2015 | Nakamura | |
| 2015/0149909 A1 | 5/2015 | Nakamura et al. | |
| 2015/0149990 A1 | 5/2015 | Nakamura | |
| 2015/0156325 A1* | 6/2015 | Miyazawa | H04M 3/568 |
| | | | 379/202.01 |

* cited by examiner

FIG.5

| No. | IMAGE | DIRECTION | COUNT | PERMISSION FOR IMAGING |
|---|---|---|---|---|
| 0001 | 010a | DIRECTION A | 15 | YES |
| 0002 | 010b | DIRECTION B | 10 | NO |
| 0003 | 010c | DIRECTION C | 1 | YES |
| ⋮ | ⋮ | ⋮ | ⋮ | ⋮ |

FIG.6

LIST OF DETECTED SPEAKER

IMAGING-BY-CAMERA SPECIFIED

SPEAKER A — YES
SPEAKER B — NO
SPEAKER C — YES
SPEAKER D — NO

FIG.9

| No. | USER ID | DIRECTION | PERMISSION FOR IMAGING |
|---|---|---|---|
| 0001 | 010a | DIRECTION A | YES |
| 0002 | 010b | DIRECTION B | NO |
| 0003 | 010c | DIRECTION C | YES |
| ⋮ | ⋮ | ⋮ | ⋮ |

| USER ID | IMAGE | PERMISSION FOR IMAGING |
|---|---|---|
| 010a | IMAGE A | YES |
| 010b | IMAGE B | NO |
| 010c | IMAGE C | YES |
| ⋮ | ⋮ | ⋮ |

| SEAT NUMBER | DIRECTION | IMAGING ALLOWED |
|---|---|---|
| 0001 | DIRECTION A | NO |
| 0002 | DIRECTION B | YES |
| 0003 | DIRECTION C | YES |
| ⋮ | ⋮ | ⋮ |

# IMAGING APPARATUS, MEDIUM, AND METHOD FOR IMAGING

BACKGROUND OF THE INVENTION

1. Field of the Invention

The present disclosure relates to an imaging unit, a medium, and a method for imaging.

2. Description of the Related Art

There has been a system that follows a participant who speaks in a conference by a camera to capture images, and distributes a video of the conference to the outside.

In such a system, a camera installed in a conference room may have, for example, a microphone array disposed to detect the direction of a participant who speaks. The direction of the camera is controlled to turn towards the direction of the detected participant, to image the speaking participant. If another participant speaks, the direction of the camera is changed to turn towards the direction of the other participant who speaks. The imaged video of the conference is distributed to terminals of viewers via a network.

For example, a technology has been disclosed that detects a direction of a speaker by using a microphone array configured to have multiple microphones arrayed, and controls the direction of the camera to turn towards the detected direction (see, for example, Patent Document 1).

However, such a conventional technology has a problem that a video cannot be viewed comfortably.

For example, if images are captured for participants who speak frequently but do not lead the discussion, such as the facilitator and an assistant of the conference, the imaging direction of the camera is frequently changed among directions of the facilitator, the assistant, and the others, and the viewers may feel sickness due to the frequently switching screen.

SUMMARY OF THE INVENTION

According to an embodiment, an imaging unit includes a storage unit configured to store information about one or more persons, the information about each of the persons including a direction in which the person exists, and permission for imaging the person by an imaging unit, and the information about each of the persons being associated with identification information to uniquely identify the person; a detection unit configured to detect a direction in which a person who speaks exists; a determination unit configured to determine whether the person in the detected direction is permitted for imaging, based on the information about the person stored in the storage unit; and a control unit configured to control an imaging direction of the imaging unit to turn towards the detected direction of the person, in a case where the determination unit has determined that the person in the detected direction is permitted for imaging.

BRIEF DESCRIPTION OF DRAWINGS

FIG. 5 is a diagram illustrating a first example of a data structure of a participant table;

FIG. 6 is a diagram illustrating a display example of a selection menu;

FIG. 9 is a diagram illustrating a second example of a data structure of a participant table;

FIG. 10 is a diagram illustrating an example of a data structure of a user table;

FIG. 12 is a diagram illustrating a third example of a data structure of a participant table.

DETAILED DESCRIPTION OF THE EMBODIMENTS

In the following, embodiments will be described with reference to the drawings. According to an embodiment, a video can be viewed comfortably. Note that elements having substantially the same functional configurations throughout the specification and drawings are assigned the same codes to avoid duplicated description.

(First Embodiment)

Figure 1:
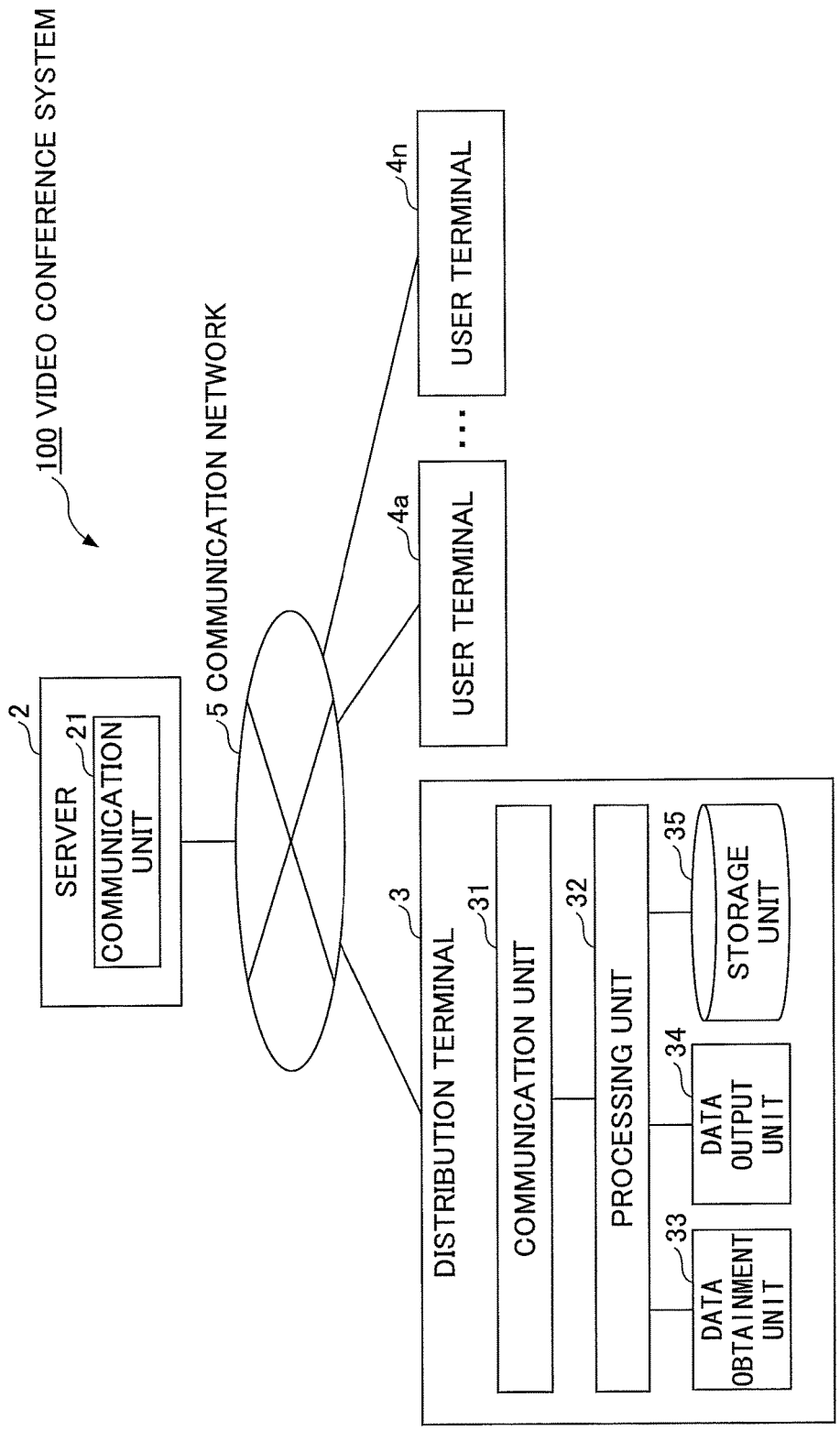
FIG. 1 is a diagram illustrating an example of an overall configuration of a video distribution system.

FIG. 1 is a diagram illustrating an example of an overall configuration of a video distribution system 1. The video distribution system 1 includes a server 2, a distribution terminal 3, and user terminals 4a-4n. The server 2 includes a communication unit 21. The distribution terminal 3 includes a communication unit 31, a processing unit 32, a data obtainment unit 33, a data output unit 34, and storage unit 35. The server 2, the distribution terminal 3, and the user terminals 4a-4n are connected with each other via a communication network 5.

The data obtainment unit 33 obtains, for example, video data and audio data in a conference room. The communication unit 31 transmits the obtained video data audio data to the server 2 via the communication network 5. The server 2 distributes the video data and audio data to the user terminals 4a-4n via the communication network 5.

Figure 2:
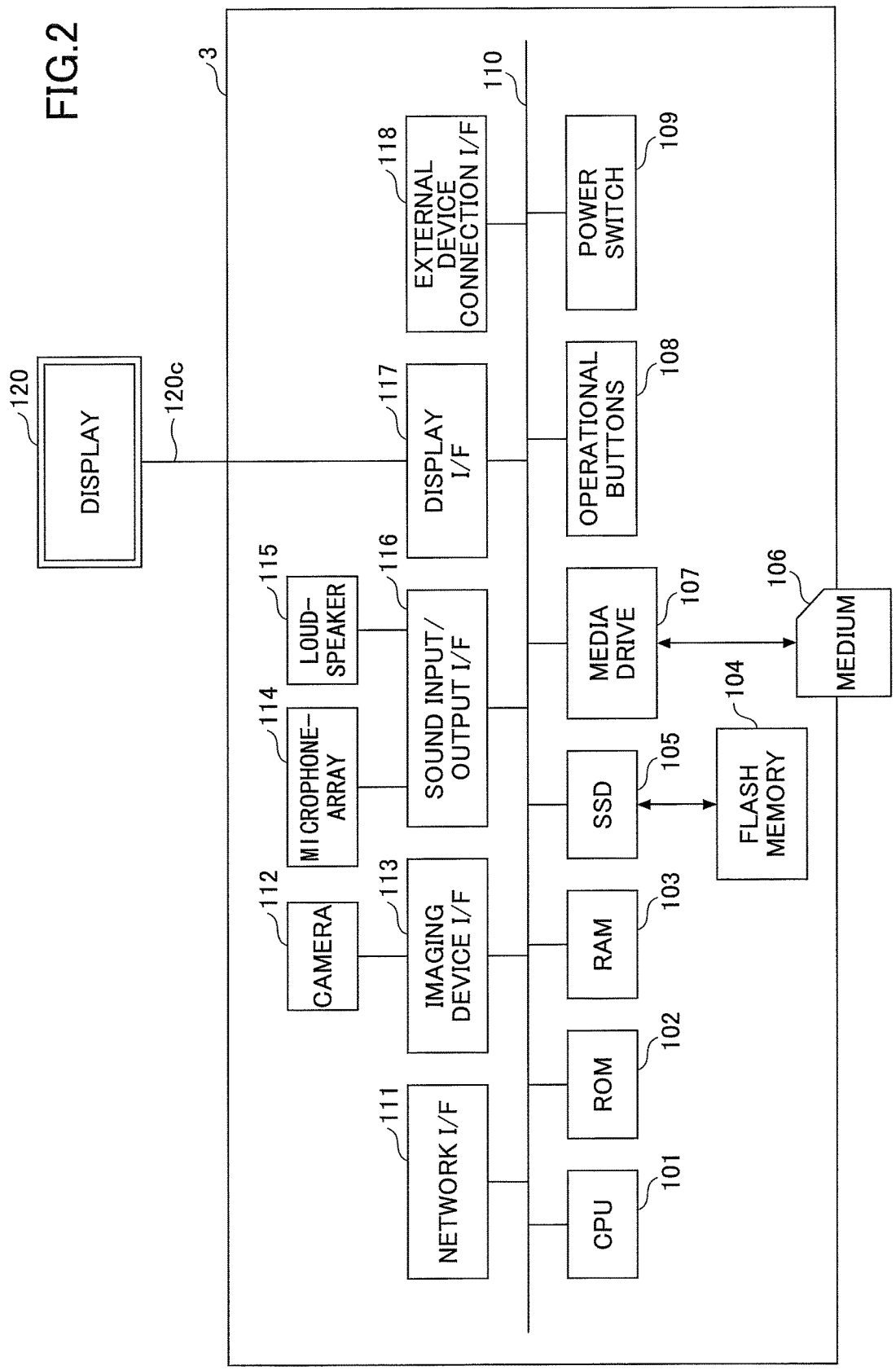
FIG. 2 is a diagram illustrating a hardware configuration of a distribution terminal.

FIG. 2 is a diagram illustrating a hardware configuration of the distribution terminal 3. As illustrated in FIG. 2, the distribution terminal 3 includes a central processing unit (CPU) 101 to control the overall behavior of the terminal 10; a read-only memory (ROM) 102 to store programs to drive the CPU 101 such as an initial program loader (IPL); a random access memory (RAM) 103 used as a work area for the CPU 101; a flash memory 104 to store programs for the terminal, and data such as image data and audio data; a solid state drive (SSD) 105 to control writes/reads of various data on the flash memory 104 under control of the CPU 101; a media drive 107 to control writes/reads of data on a recording media 106 such as a flash memory; operational buttons 108 operated when selecting a destination of the distribution terminal 3; a power switch 109 to turn on and off the power of the distribution terminal 3; and a network interface (I/F) 111 to transmit data by using the communication network 5.

The distribution terminal 3 also includes a built-in camera 112 to obtain image data by capturing images of an object under control of the CPU 101; an imaging device I/F 113 to control the camera 112; a built-in microphone 114 to input sound; a built-in loudspeaker 115 to output sound; a sound input/output I/F 116 to input/output audio signals between the microphone 114 and the loudspeaker 115 under control of the CPU 101; a display I/F 117 to transfer image data to an external display 120 under control of the CPU 101; an external device connection I/F 118 to have various external devices connected; and a bus line 110 including an address bus, a data bus, and the like to have the above elements electrically connected with each other as illustrated in FIG. 2.

The display 120 is a display unit constituted with a liquid crystal display (LCD) or an organic electroluminescence (EL) display to display images of an object, operational icons, and the like. Also, the display 120 is connected with the display I/F 117 via a cable 120c. The cable 120c may be a cable for analog RGB (VGA) signals, a cable for component video, or a cable for High-Definition Multimedia Interface (HDMI) or Digital Video Interactive (DVI).

The camera 112 includes a solid-state imaging device to convert light into electric charge to obtain an electronic image of an object. As a solid-state imaging device, a complementary metal oxide semiconductor (CMOS) or a charge coupled device (CCD) may be used.

The external device connection I/F 118 may be connected with an external camera, an external microphone, an external loudspeaker, or the like, via a Universal Serial Bus (USB) cable or the like. If having an external camera connected, the external camera is driven under control of the CPU 101, with priority over the built-in camera 112. Similarly, if having an external microphone or an external loudspeaker connected, the external microphone or loudspeaker is driven under control of the CPU 101, with priority over the built-in microphone 114 or the built-in loudspeaker 115, respectively.

Note that the recording media 106 can be easily attached to or detached from the distribution terminal 3. Also, instead of the flash memory 104, an electrically erasable and programmable ROM (EEPROM) or the like may be used, as long as the device is a non-volatile memory with which reads/writes of data can be executed under control of the CPU 101.

Furthermore, the programs for the terminal may be recorded on a computer-readable recording medium, such as the recording medium 106, to be distributable and as files installable or executable on a computer. Also, the programs for the terminal may be stored in the ROM 102 instead of the flash memory 104.

Figure 3:
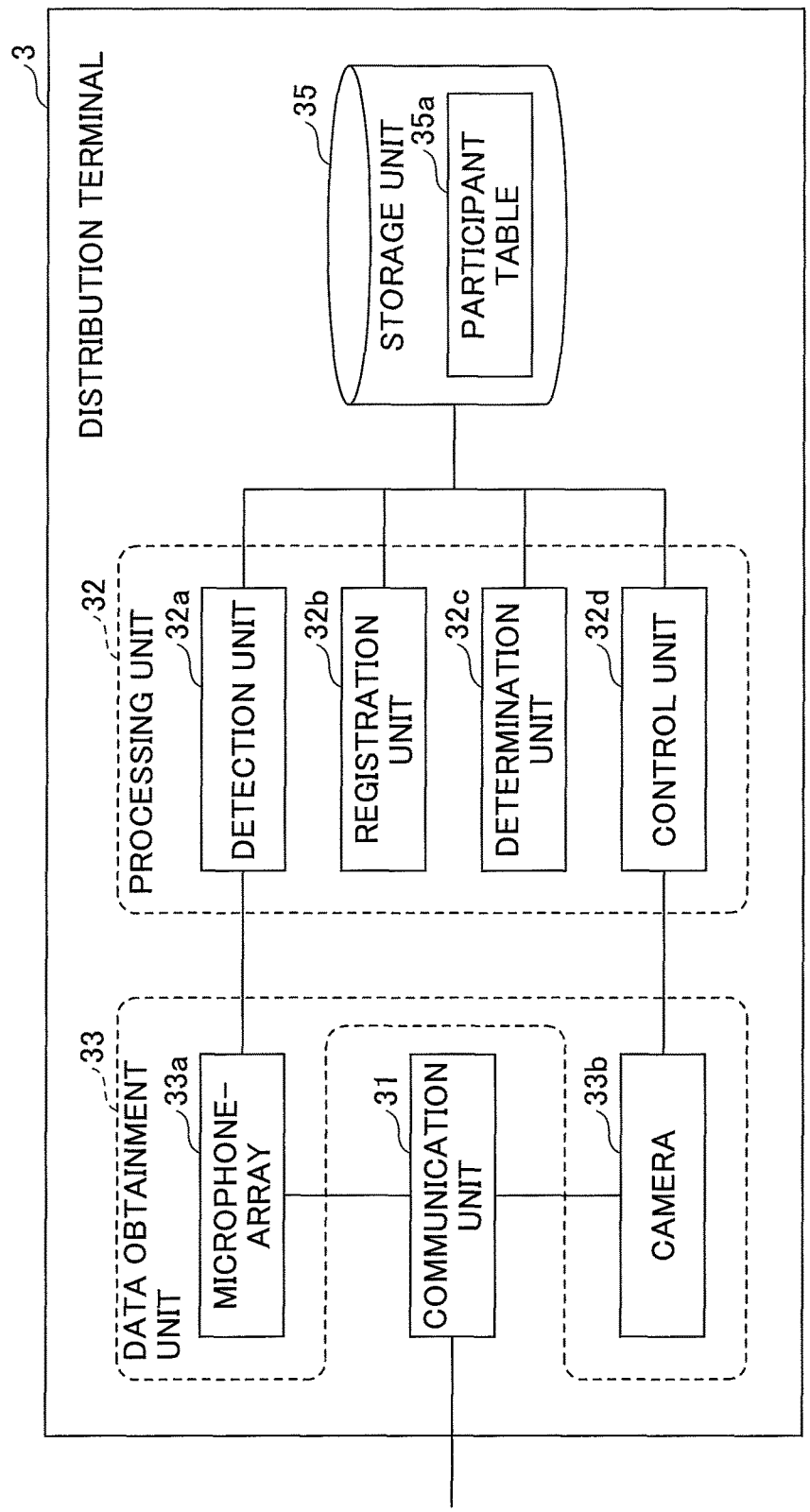
FIG. 3 is a diagram illustrating an example of a functional configuration of a distribution terminal according to a first embodiment.

FIG. 3 is a diagram illustrating an example of a functional configuration of the distribution terminal 3 according to the first embodiment. The storage unit 35 includes a participant table 35a. The data obtainment unit 33 includes a microphone-array 33a and a camera 33b. The microphone-array 33a obtains audio data in a conference room, and identifies a direction of a speaker who speaks in the conference room.

The camera 33b obtains image data and video data of a speaker. The camera 33b stores an obtained image of a speaker in the participant table 35a. The communication unit 31 transmits video data and audio data in the conference room to the server 2.

The processing unit 32 includes a detection unit 32a, a registration unit 32b, a determination unit 32c, and a control unit 32d. The detection unit 32a detects the direction of a participant who speaks in the conference room by using the microphone-array 33a. For example, the detection unit 32a obtains positional coordinates $(X_0,Y_0)$ of the camera 33b and an imaging angle θ when imaging a participant where θ is relative to the imaging angle of 0 degree that corresponds to the imaging direction from the origin having the coordinates (0,0) towards a reference point in the conference room having the coordinates $(0,Y_0)$. In the following, data about as imaging direction that corresponds to the position of a speaker will be referred to as "direction data". The direction data is represented by, for example, $(X_0,Y_0,\theta)$ where $(X_0, Y_0)$ represents the positional coordinates of the camera 33b and θ represents an imaging angle of a participant.

Figure 4:
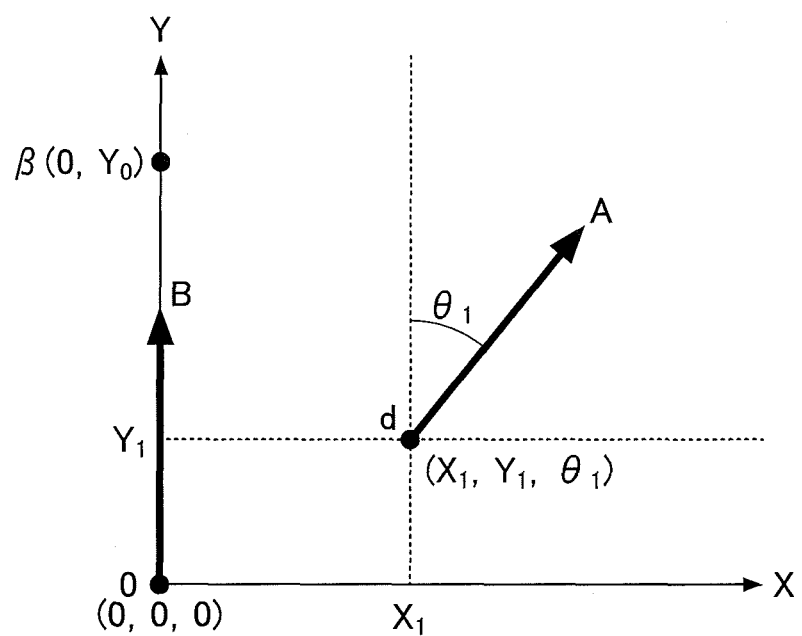
FIG. 4 is a diagram illustrating a relationship between positional coordinates and an angle of a camera.

FIG. 4 is a diagram illustrating a relationship between positional coordinates and an angle of the camera 33b. Direction data B(0,0,0) represents the positional coordinates (0,0) of the camera 33b and the imaging angle 0 degree, which corresponds to the imaging direction from the origin (0,0) towards the reference point $(0,Y_0)$.

Direction data $A(X_1,Y_1,\theta_1)$ represents the positional coordinates $(X_1,Y_1)$ of the camera 33b and the imaging angle $\theta_1$, which corresponds to a direction in which a speaker has been detected. The positional coordinates $(X_1,Y_1)$ of the camera 33b represent a position where the camera 33b is installed. Also, the imaging angle $\theta_1$ represents an imaging angle of a speaker viewed from the positional coordinates $(X_1,Y_1)$ relative to the imaging angle of 0 degree, which corresponds to the imaging direction from the origin (0,0) towards the reference point $(0,Y_0)$. Note that if the camera 33b is fixed at the origin (0,0), the direction data may be represented just by the imaging angle θ.

Also, the detection unit 32a may detect a speaker by using multiple cameras 33b. For example, the detection unit 32a may detect a speaker by using multiple cameras 33b, based on an identification number n assigned to one of the cameras 33b, and data $(X_0,Y_0,\theta)$ representing the position of the camera 33b and the imaging angle, to obtain direction data $(n,X_0,Y_0,\theta)$ including the identification number n of the camera 33b.

Referring back to FIG. 3, if having obtained direction data that has not been registered in the participant table 35a, the registration unit 32b determines that the data is about a speaker who speaks for the first time in the conference, and to be registered in the participant table 35a. Next, the registration unit 32b controls the imaging direction of the camera 33b to turn towards the direction corresponding to the direction data, to obtain an image of the speaker. Next, the registration unit 32b associates the obtained image of the speaker with the direction data, and registers the associated data in the participant table 35a. Note that if the obtained direction data matches one of direction data items registered in the participant table 35a, the registration unit 32b determines that a participant who has been already registered in the participant table 35a speaks, and hence, the obtained direction data does not need to be registered again in the participant table 35a.

The determination unit 32c determines whether to image a speaker detected by the detection unit 32a. For example, the determination unit 32c determines not to image a speaker if the speaker is specified not to be imaged in the participant table 35a. On the other hand, the determination unit 32c determines to image a speaker if the speaker is specified to be imaged in the participant table 35a, and indicates the determination result to the control unit 32d.

FIG. 5 is a diagram illustrating a first example of a data structure of the participant table 35a. The participant table 35a is stored in the storage unit 35. The participant table 35a is configured to include the image, the imaging direction, frequency (count) of imaging, and permission for imaging of a participant, associated with each other. The field "No." represents a sequential number of a speaker in order of detection of the speaker's first utterance. For example, the participant table 35a stores "0001" as "No." for a speaker who speaks first in the conference to be imaged, and "0002"

as "No." for the next imaged speaker. The field "image" represents an image of a speaker captured by the camera 33b, and is stored in a format such as JPEG and GIF. The field "direction" represents direction data of an imaging direction of a detected speaker. Direction data is represented by, for example, $(X_0, Y_0, \theta)$ including positional coordinates $(X_0, Y_0)$ of the camera 33b and an imaging angle $\theta$ when a speaker is detected. The field "count" represents frequency of utterance of a speaker. The field "permission for imaging" represents whether to image a participant when the participant speaks. The "permission for imaging" set to "YES" represents that the participant is to be imaged when the participant speaks, and the "permission for imaging" set to "NO" represents that the participant is not to be imaged even when the participant speaks. Note that the initial value of the "permission for imaging" may be to "YES", and may be changed to "NO" appropriately if a participant is not to be imaged.

Referring back to FIG. 3, the control unit 32d controls the imaging direction of the camera 33b in response to a determination result by the determination unit 32c. For example, the control unit 32d may control the camera 33b to turn around toward the direction of the speaker depending on the direction data of speaker. Also, if the camera 33b images the entire conference room from the front, the control unit 32d may control the camera 33b so that the video of the speaker is enlarged based on the direction data of the speaker. The communication unit 31 distributes data imaged by the camera 33b to viewers via the communication network 5.

FIG. 6 is a diagram illustrating a display example of a selection menu 120A. The selection menu 120A is a menu screen to specify whether to image speakers detected by the detection unit 32a. The selection menu 120A is displayed, for example, on a monitor connected with the data output unit 34.

On the selection menu 120A, participants detected by the detection unit 32a are displayed in descending order of the frequency of utterance. In this example, the speaker A is a participant with the greatest frequency of utterance, the speaker B is a participant with the second greatest frequency of utterance, the speaker C is a participant with the third greatest frequency of utterance, and the speaker D is a participant with the fourth greatest frequency of utterance. The speaker A, the speaker B, the speaker C, and the speaker D may correspond to participants having "No." of, for example, "0001", "0002", "0003", and so on in FIG. 5, respectively. Note that the frequency of utterance corresponds to the field "count" in the participant table 35a in FIG. 5.

On the selection menu 120A, images of corresponding participants are displayed on the right side of the speaker A, the speaker B, the speaker C, and the speaker D. Images of the speaker A, the speaker B, the speaker C, and the speaker D, may correspond to the images "010a", "010b", "010c", and so on in FIG. 5, respectively.

Also, selection buttons displayed under "IMAGING-BY-CAMERA SPECIFIED" and on the right of images of the speakers represent whether imaging is permitted for the respective participants. For example, since "YES" is selected for the speaker A, the speaker A is to be imaged by the camera 33b when the speaker A speaks. Also, since NO is selected for the speaker B, the speaker B is not to be imaged by the camera 33b when the speaker B speaks.

Also, whether to image each participant can be switched by clicking the corresponding "IMAGING-BY-CAMERA SPECIFIED" button. Specified "YES" or "NO" on an "IMAGING-BY-CAMERA SPECIFIED" button corresponds to the field "permission for imaging" in FIG. 5; if "YES" and "NO" are switched by a click on an "IMAGING-BY-CAMERA SPECIFIED" button, "YES" and "NO" are switched in the field "permission for imaging" in FIG. 5.

Figure 7:
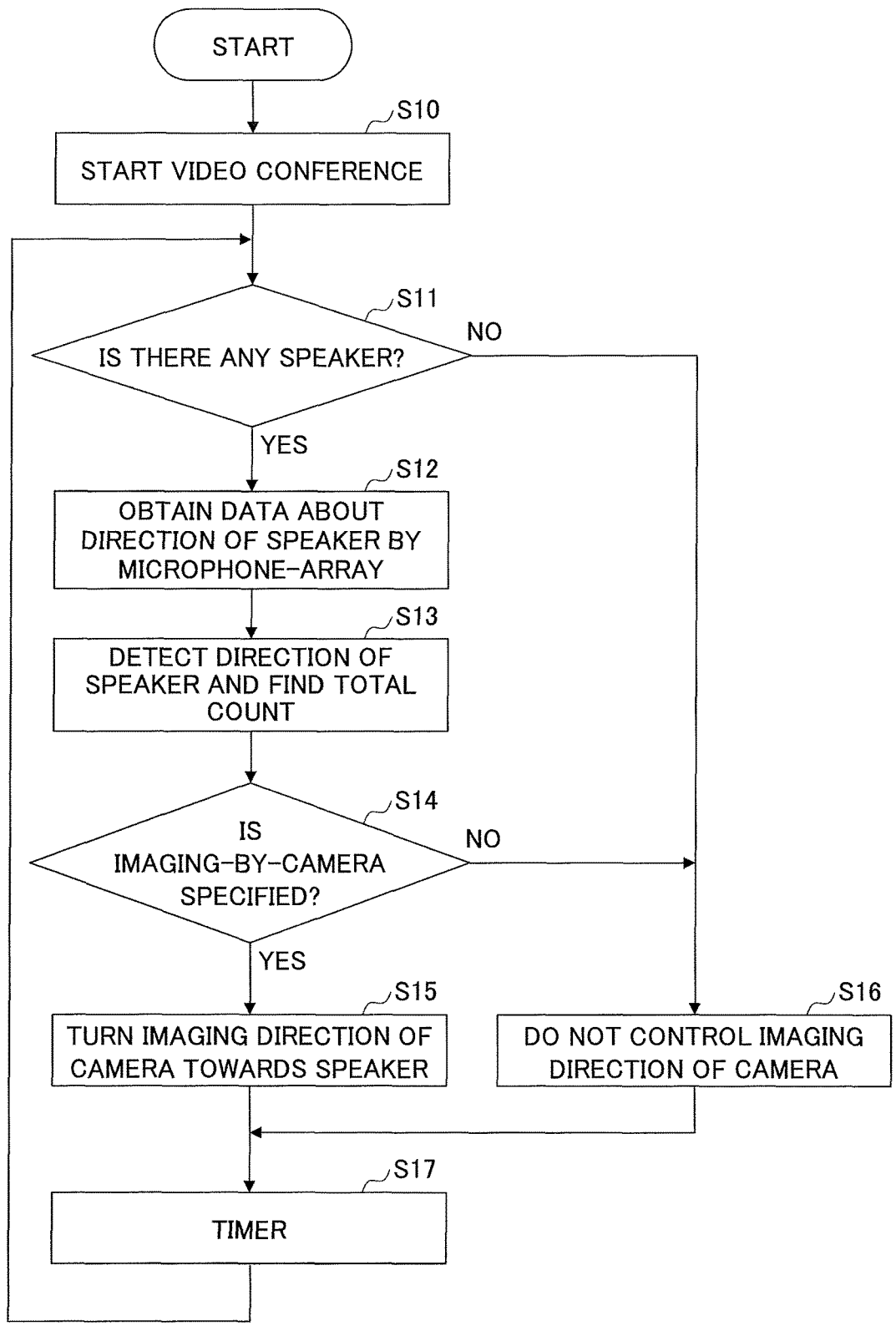
FIG. 7 is a diagram illustrating a control flow according to the first embodiment.

FIG. 7 is a diagram illustrating a control flow according to the first embodiment. Once a video conference has been started (Step S10), the detection unit 32a determines whether there is a speaker (Step S11). If there is no speaker (NO at Step S11), the detection unit 32a does not transmit a command to control the camera to the control unit 32d (Step S16), and after a predetermined time elapses on a timer (Step S17), executes Step S11 again.

On the other hand, if there is a speaker (YES at Step S11), the detection unit 32a obtains direction data of the speaker by the microphone-array 33a (Step S12). Next, the detection unit 32a detects the direction of the speaker based on the obtained direction data, and finds the total count of utterance (Step S13). For example, if the speaker is registered in the participant table 35a in FIG. 5, the detection unit 32a counts up the frequency of utterance in the record that corresponds to the speaker.

If the speaker speaks for the first time in the conference, the registration unit 32b generates a new record in the participant table 35a in FIG. 5, associates the image of the speaker captured by the camera 33b, detected direction data, and the like with a common "No." to register in the participant table 35a (Step S13). In this case, the registration unit 32b may store "YES" in the field "permission for imaging" in the participant table 35a as the initial value.

Next, the determination unit 32c refers to the participant table 35a, and determines whether permission for imaging is not specified for the participant (Step S14). If permission for imaging is not specified for the participant (NO at Step S14), the detection unit 32a does not transmit a command to control the camera 33b to the control unit 32d (Step S16), and after a predetermined time elapses on a timer (Step S17), executes Step S11 again.

On the other hand, if permission for imaging is specified for the participant (YES at Step S14), the detection unit 32a transmits a command to control the camera 33b to the control unit 32d (Step S16), and goes to Step S15. At Step S15, the control unit 32d controls the camera 33b to turn the imaging direction towards the speaker based on direction data registered in the participant table 35a. Next, after a predetermined time elapses on a timer (Step S17), the determination unit 32c executes Step S11 again.

As described above, whether to image a speaker by the camera 33b is determined based on whether permission for imaging is specified for the speaker, the switching frequency of the imaging direction of the camera 33b can be reduced, and hence, viewers can view the video more comfortably.

(Second Embodiment)

Figure 8:
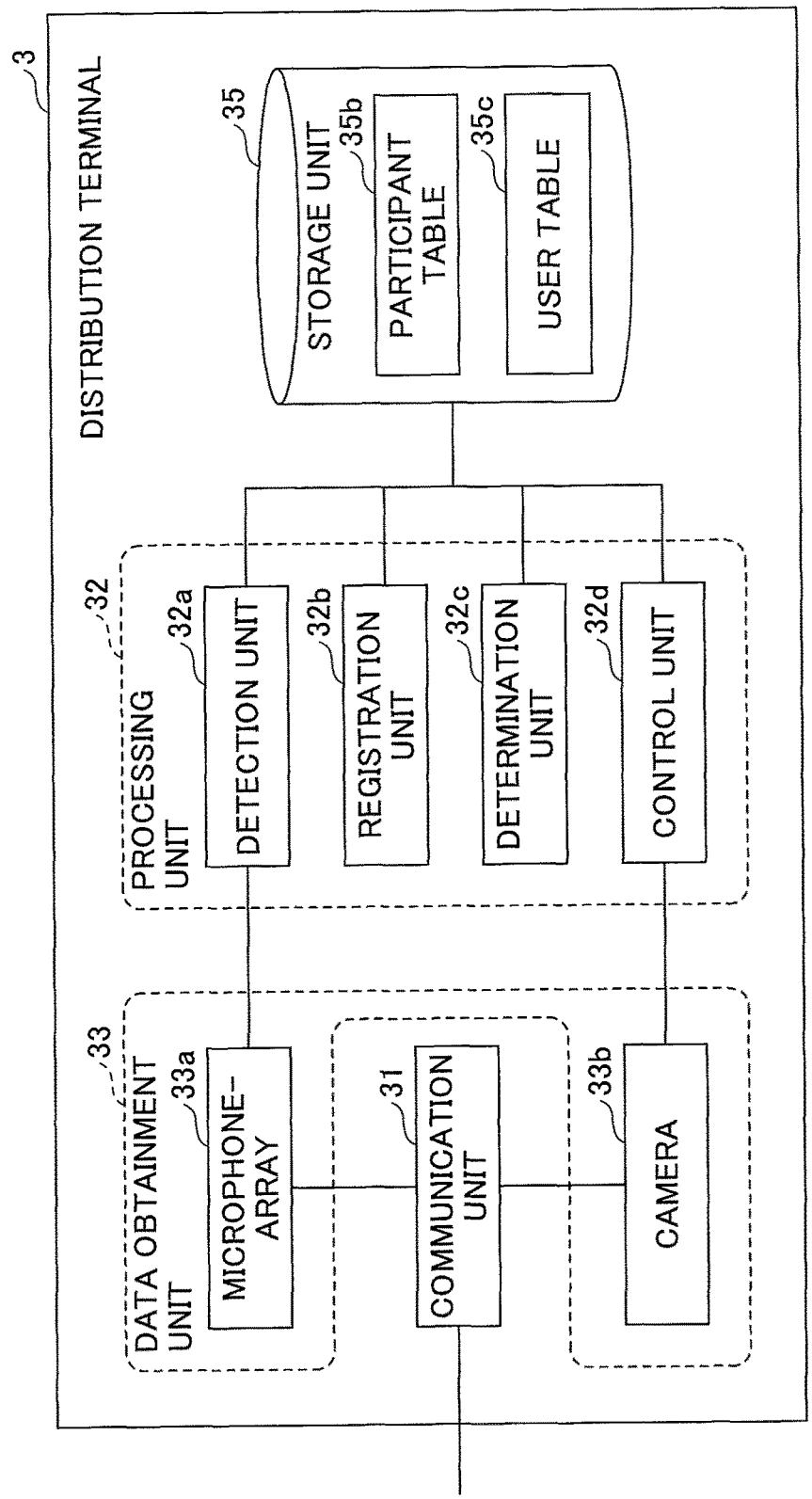
FIG. 8 is a diagram illustrating an example of a functional configuration of a distribution terminal according to a second embodiment.

FIG. 8 is a diagram illustrating an example of a functional configuration of a distribution terminal 3 according to a second embodiment. The data obtainment unit 33 includes the microphone-array 33a and the camera 33b.

The storage unit 35 includes the participant table 35b and a user table 35c. The participant table 35b stores direction data and permission for imaging that are associated with each other, for each participant. Also, the user table 35c stores a face image for face authentication of each participant and a user ID of the participant that are associated with each other.

FIG. 9 is a diagram illustrating a second example of a data structure of the participant table 35b. The participant table 35b includes the user ID and the imaging direction of each participant, associated with each other. The field "No." represents a sequential number of a speaker in order of detection of the speaker's first utterance. The field "user ID" is identification information to uniquely identify the user, and represented by digits or a combination of digits, letters, and symbols. One "user ID" is assigned to each user in advance. The field "direction" represents an imaging direction of a detected speaker. The field "permission for imaging" represents whether to capture an image of a participant when the participant speaks.

FIG. 10 is a diagram illustrating an example of a data structure of the user table 35c. The field "user ID" is identification information to uniquely identify the user, and corresponds to the "user ID" in the participant table 35b. The field "image" represents a face image of a user. The face image is used for identifying the user ID of a speaker by face authentication. The field "permission for imaging" represents whether to capture an image of a participant when the participant speaks.

Note that, the initial value of the field "permission for imaging" in the participant table 35b in FIG. 9 may be a copy of the "permission for imaging" in the user table 35c in FIG. 10. Also, the "permission for imaging" in the participant table 35b in FIG. 9 may be changed later.

Also, the participant table 35b in FIG. 9 may not include the field "permission for imaging". For example, if the participant table 35b in FIG. 9 does not include the field "permission for imaging", the processing unit 32 may use the user ID in the user table 35c in FIG. 10 as an external key, to refer to the field "permission for imaging" of a corresponding record in the user table 35c.

The processing unit 32 includes the detection unit 32a, the registration unit 32b, the determination unit 32c, and the control unit 32d.

The detection unit 32a detects the direction of a participant who speaks in the conference room by using the microphone-array 33a. Based on the detected direction data, the detection unit 32a identifies a record of the speaker in the participant table 35b, and indicates the "No." of the record to the determination unit 32c.

If the detected direction data is direction data for a speaker who speaks for the first time in the conference, the registration unit 32b controls the camera 33b to turn around in the direction of the speaker based on the direction data detected by the detection unit 32a, to obtain image data including a face image of the speaker. Next, the registration unit 32b compares the obtained image data with the image in the user table 35c in FIG. 10 by face authentication or the like. For example, the registration unit 32b may use a face authentication algorithm based on eigenfaces or the like for face authentication.

Next, the registration unit 32b identifies a record in the user table 35c that includes the image equivalent to the image data, and obtains the user ID and the permission for imaging in the identified record. Next, the registration unit 32b stores the direction data obtained by the camera 33b, and the user ID and the permission for imaging obtained from the user table 35c in FIG. 10, in a new record in the participant table 35b.

The determination unit 32c determines whether to image the speaker depending on the permission for imaging in the record having the "No." indicated by the detection unit 32a.

The control unit 32d controls the imaging direction of the camera 33b based on a determination result by the determination unit 32c.

Figure 11:
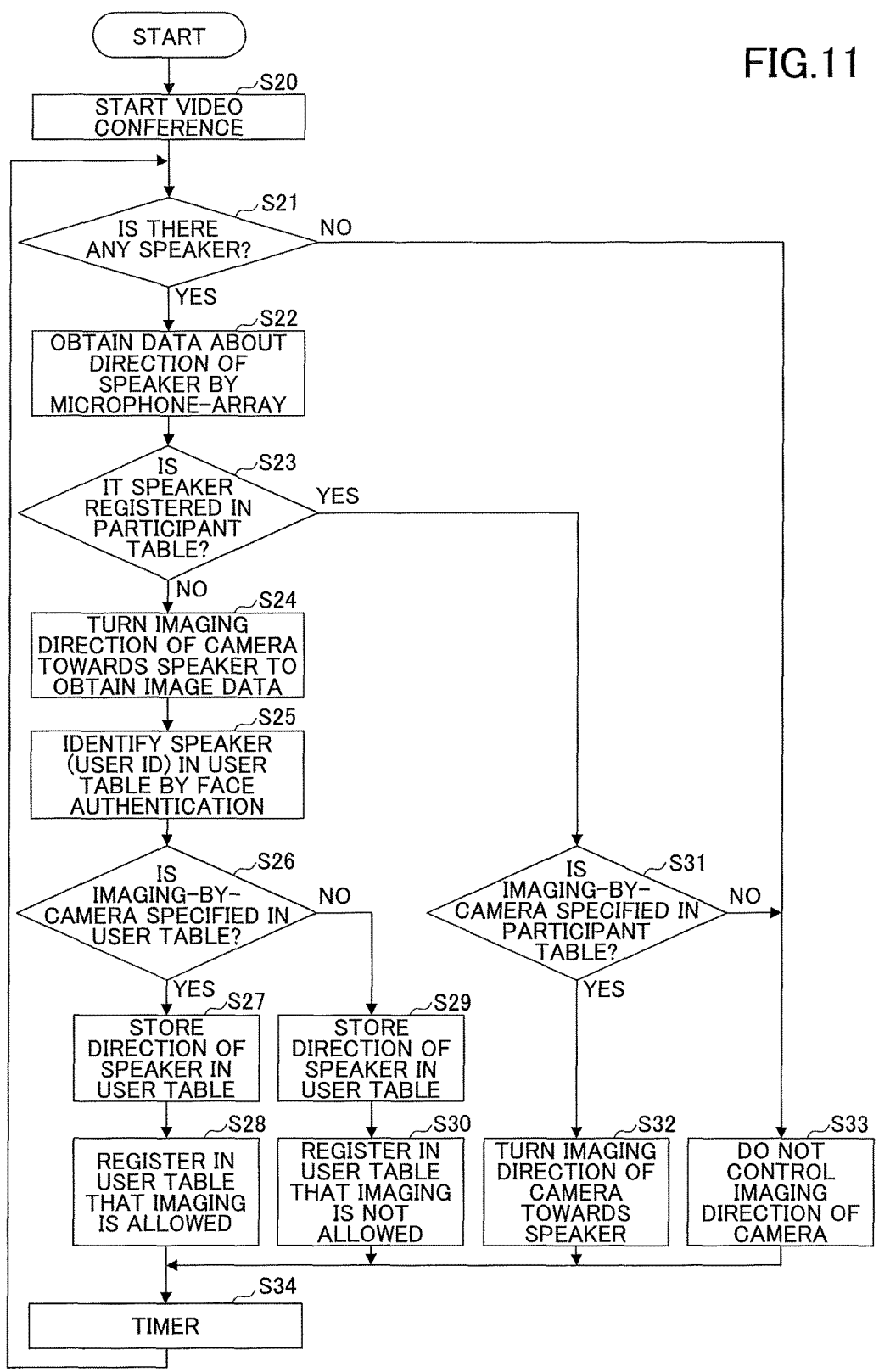
FIG. 11 is a diagram illustrating a control flow according to the second embodiment.

FIG. 11 is a diagram illustrating a control flow according to the second embodiment. Once a video conference has been started (Step S20), the detection unit 32a determines whether there is a speaker (Step S21). If there is no speaker (NO at Step S21), the detection unit 32a does not transmit a command to control the camera to the control unit 32d (Step S33), and after a predetermined time elapses on a timer (Step S34), executes Step S21 again.

On the other hand, if there is a speaker (YES at Step S21), the detection unit 32a obtains direction data of the speaker by the microphone-array 33a (Step S22). Next, based on the obtained direction data of the speaker, the detection unit 32a determines whether the speaker has already been registered in the participant table 35b (Step S23).

If the speaker is new (NO at Step S23), the registration unit 32b turns around the imaging direction of the camera 33b towards the speaker, and obtains the image data including a face image of the speaker (Step S24). Next, the registration unit 32b compares the obtained image data with the image in the user table 35c by face authentication or the like, to identify the user ID of the speaker (Step S25).

At Step S26, based on the record in the user table 35c that corresponds to the identified user ID, the registration unit 32b determines whether permission for imaging is specified for the speaker. If permission for imaging is specified for the speaker (YES at Step S26), the registration unit 32b stores the direction data of the speaker in the participant table 35b (Step S27). Further, the registration unit 32b registers in the participant table 35b that imaging is permitted for the speaker (Step S28). On the other hand, if permission for imaging is not specified for the speaker (NO at Step S26), the registration unit 32b stores the direction data of the speaker in the participant table 35b (Step S29). Further, the registration unit 32b registers in the participant table 35b that imaging is not permitted for the speaker (Step S30). Next, the detection unit 32a goes to Step S34.

On the other hand at Step S23, if the speaker has been registered in the participant table 35b (YES at Step S23), the determination unit 32c determines whether permission for imaging by the camera 33b is specified (Step S31). If permission for imaging by the camera 33b is specified (YES at Step S31), the control unit 32d turns around the imaging direction of the camera 33b towards the speaker (Step S32). On the other hand, if permission for imaging by the camera 33b is not specified (NO at Step S31), the control unit 32d does not control the imaging direction of the camera 33b (Step S33). Next, the detection unit 32a goes to Step S34.

As described above, permission for imaging is set in advance for each user to determine whether a user identified by face authentication is permitted for imaging, and hence, it is possible to save time and trouble of setting permission for imaging for each participant.

(Third Embodiment)

The distribution terminal 3 may set permission for imaging for each seat number to be seated by a participant. The functional configuration of the distribution terminal 3 is substantially the same as in the first embodiment (FIG. 3). The data structure of a participant table 35d differs from the data structure in the first embodiment.

FIG. 12 is a diagram illustrating a third example of a data structure of the participant table 35d. The participant table 35d is stored in the storage unit 35. The participant table 35d includes the seat number, the imaging direction, and the permission for imaging of each participant that are associated with each other. The field "seat number" represents a seat number of a participant. For example, a unique seat number is assigned for each seat in the conference room. The field "direction" is an imaging direction that corresponds to the seat number. For example, each seat is assigned the direction data $(X,Y,\theta)$ that includes $(X,Y)$ representing the positional coordinates of the camera 33b, and $\theta$ representing an imaging angle of a participant. The field "permission for imaging" represents whether to image a participant when the participant speaks. For example, by setting "NO" to "permission for imaging" for a seat number "0001" to be seated by a participant who is not to be imaged, the camera 33b is controlled so as not to image the participant sitting on the seat number "0001" during the conference.

The detection unit 32a detects the direction of a participant who speaks in the conference room by using the microphone-array 33a. The detection unit 32a obtains the positional coordinates $(X_0, Y_0)$ of the camera 33b and the imaging angle $\theta$ of the participant as the direction data $(X_0, Y_0, \theta)$, and transmits the direction data $(X_0, Y_0, \theta)$ to the determination unit 32c.

If permission for imaging for the speaker is not specified in a record of the seat number in the participant table 35d that corresponds to the direction data $(X_0, Y_0, \theta)$, the determination unit 32c determines not to image the detected speaker. On the other hand, if permission for imaging for the speaker is specified in the record of the seat number in the participant table 35d that corresponds to the direction data $(X_0, Y_0, \theta)$, the determination unit 32c determines to image the detected speaker, and indicates the determination result to the control unit 32d.

The control unit 32d controls the imaging direction of the camera 33b based on the determination result by the determination unit 32c.

As described above, by setting permission for imaging in advance for each seat number to be seated by a participant, permission for imaging can be set for participants before starting the conference.

Also, functions of the distribution terminal 3 according to the first to third embodiments may be implemented by executing a program stored in a computer-readable medium.

Thus, the distribution terminal 3 has described according to the first to third embodiments. Note that the present invention is not limited to the above embodiments, but may be changed and improved within the scope of the present invention.

Note that the distribution terminal 3 in the embodiments is an example of an imaging unit. The storage unit 35 is an example of a storage unit. The detection unit 32a is an example of a detection unit. The determination unit 32c is an example of a determination unit. The control unit 32d is an example of a control unit. The registration unit 32b is an example of a registration unit. The camera 33b is an example of an imaging unit.

RELATED-ART DOCUMENTS

[Patent Documents]

[Patent Document 1] Japanese Laid-open Patent Publication No. 2008-103824

The present application claims the benefit of priority under 35 U.S.C. §119 of Japanese Patent Application No. 2015-149049, filed on Jul. 28, 2015, the contents of which are incorporated herein by reference in their entirety.

What is claimed is:

1. An imaging apparatus, comprising:
   a storage unit configured to store information about one or more persons, the information about each of the persons including a direction in which the person exists, and permission for imaging the person by an imaging unit, and the information about each of the persons being associated with identification information to uniquely identify the person;
   a detection unit configured to detect a direction in which a person who speaks exists;
   a determination unit configured to determine whether the person in the detected direction is permitted for imaging, based on the information about the person stored in the storage unit; and
   a control unit configured to control an imaging direction of the imaging unit to turn towards the detected direction of the person after the determination unit has determined that the person in the detected direction is permitted for imaging.

2. The imaging apparatus according to claim 1, wherein the storage unit further stores an image of the person associated with the identification information, the imaging apparatus further comprising:
   a registration unit configured, if the detection unit detects a new direction, to register the image of the person in the new direction in the storage unit so as to be associated with the identification information.

3. The imaging apparatus according to claim 2, wherein in a case where the permission for imaging is specified for the person stored in the storage unit, the registration unit registers the permission for imaging in the storage unit so as to be associated with the identification information based on the specification.

4. The imaging apparatus according to claim 1, wherein the detection unit identifies the identification information, based on comparison between the image of the person in the detected direction, and the image stored in the storage unit.

5. The imaging apparatus according to claim 1, wherein the determination unit is configured not to send a command to turn the imaging unit to the control unit when the determination unit determines that the person in the detected direction is not permitted for imaging, and the determination unit is configured to send the command to turn the imaging unit to the control unit only when the determination unit determines that the person in the detected direction is permitted for imaging.

6. The imaging apparatus according to claim 1, further comprising a registration unit configured to register, when a direction of the person who speaks is not stored in the storage unit, an image data of a detected person who speaks, a direction data of the detected person who speaks, and the permission for imaging the person who speaks as an initial setting.

7. The imaging apparatus according to claim 1, wherein the detection unit is further configured to:
   detect the direction of the person who speaks based on a direction data of the detected person who speaks, and obtain a total count of utterance of the person speaks, and
   count up the total count of utterance with respect to the person who speaks.

8. A non-transitory computer-readable recording medium having a program stored therein for causing a computer to execute a process, the process comprising:
   detecting a direction in which a person who speaks exists;
   determining whether the person in the detected direction is permitted for imaging, based on information about the person stored in a storage unit that stores information about one or more persons, the information about each of the persons including a direction in which the person exists, and permission for imaging the person by an imaging unit, and the information about each of the persons being associated with identification information to uniquely identify the person; and controlling an imaging direction of the imaging unit to turn towards the detected direction of the person after the determining has determined that the person in the detected direction is permitted for imaging.

9. A method for imaging, executed by a computer, the method comprising:

detecting a direction in which a person who speaks exists;

determining whether the person in the detected direction is permitted for imaging, based on information about the person stored in a storage unit that stores information about one or more persons, the information about each of the persons including a direction in which the person exists, and permission for imaging the person by an imaging unit, and the information about each of the persons being associated with identification information to uniquely identify the person; and controlling an imaging direction of the imaging unit to turn towards the detected direction of the person after the determining has determined that the person in the detected direction is permitted for imaging.

\* \* \* \* \*